United States Patent
Lewis

(10) Patent No.: US 9,300,416 B2
(45) Date of Patent: Mar. 29, 2016

(54) LIVE RADIO TRANSFORMER

(71) Applicant: Alexander Lee Lewis, Bealeton, VA (US)

(72) Inventor: Alexander Lee Lewis, Bealeton, VA (US)

(73) Assignee: Alexander Lee Lewis, Warrenton, VA (US)

( * ) Notice: Subject to any disclaimer, the term of this patent is extended or adjusted under 35 U.S.C. 154(b) by 350 days.

(21) Appl. No.: 13/748,530

(22) Filed: Mar. 25, 2013

(65) Prior Publication Data

US 2014/0288684 A1    Sep. 25, 2014

(51) Int. Cl.
| | |
|---|---|
| *H04H 60/27* | (2008.01) |
| *G11B 20/00* | (2006.01) |
| *H04H 20/40* | (2008.01) |
| *G11B 20/10* | (2006.01) |

(52) U.S. Cl.
CPC ......... *H04H 60/27* (2013.01); *G11B 20/00992* (2013.01); *H04H 20/40* (2013.01); *G11B 20/10* (2013.01); *G11B 2020/10546* (2013.01)

(58) Field of Classification Search
CPC .... H04H 60/27; H04H 60/33; G06F 17/3074; G11B 20/00992; G11B 20/10; G11B 2020/10546; G11B 2020/1062
USPC .................. 700/94; 715/203; 360/1; 725/133; 455/3.06
See application file for complete search history.

(56) References Cited

U.S. PATENT DOCUMENTS

| | | | | |
|---|---|---|---|---|
| 5,671,195 | A  * | 9/1997 | Lee .................................... | 369/7 |
| 2002/0002039 | A1* | 1/2002 | Qureshey ............... | H04H 60/74 |
| | | | | 455/344 |
| 2002/0045438 | A1* | 4/2002 | Tagawa et al. ................ | 455/412 |
| 2002/0174243 | A1* | 11/2002 | Spurgat ................. | H04H 60/88 |
| | | | | 709/231 |
| 2003/0206499 | A1* | 11/2003 | Schwartz .......................... | 369/7 |
| 2004/0116088 | A1* | 6/2004 | Ellis et al. ..................... | 455/132 |
| 2009/0258677 | A1* | 10/2009 | Ellis et al. .................. | 455/556.1 |

* cited by examiner

*Primary Examiner* — Jesse Elbin

(57) ABSTRACT

My innovative idea to create, program and provide manufactured boomboxes/car stereos with capabilities to record, play, pause, rewind, fast forward and save live radio feeds.

12 Claims, 8 Drawing Sheets

LIVE RADIO TRANSFORMER

DETAILED DESCRIPTION OF INVENTION

Since the first ever electromagnetic radio wave known to man was created in a lab in 1888, radio has grown/developed significantly. Radio then up until the early 1900's was more or less energy mixed with magnetism forming radio waves or electricity flowing into a transmitter vibrating and producing radio wave lengths that travel through air until reaching its destination, a receiver antenna that produced electric current.

Though radio has come a long way from generating sound frequencies (hertz) at the speed of light carrying program signals from huge transmitter antennas connected to radio stations, to much smaller antennas on vehicles, radio sets, alarm clock radios and even on mobile/portable devices some even in HD; my invention "Live Radio Transformer (LRT)" will be one of the greatest radio enhancements to date. My innovative idea is to literally transform live radio (hence the name) and this enhancement will provide the abilities to pause, record, rewind and fast forward live radio feeds, whether in standard or high definition, regardless if on a vehicle stereo, a boombox, alarm clock radio, or even on mobile/portable devices. These resources used to hear radio already receive frequency and amplitude modulation through fluctuations in carriers, however the capabilities to record a live feed, pause a live feed, to then be able to rewind, fast forward, and save them at will has never existed. Well, now it does through my invention; the "Live Radio Transformer (LRT)" which allows one to do more with radio feeds, beyond just rewinding and fast forwarding.

The "LRT[1]" differs from anything else as it allows long recording time intervals, has saving capacity that allows recordings to be stored on a vehicle stereo, boombox, alarm clock radio, and even mobile/portable devices up to thirty days or until you advise to delete items. It also allows one to sync to home stationary radio devices or even local public wireless radio devices to hear the same paused/recorded feeds from your vehicle through Wi-Fi or internets compatible to permit connections to your vehicle. My innovation has many features and will be a great booster for analog radio in general and will make radio competitive and a demanded resourceful way to receive information/entertainment we like to hear and know about. The (LRT) will be supported by digital recording/storing technologies. The system will also include my created Live Radio/Record buttons. The live radio button will instantly take you right back to current regularly scheduled radio feeds after having paused, or rewound a broadcast for up to 30 plus minutes, for any reason at any point whether in a vehicle or at a place where either a boombox, alarm clock radio or mobile/portable device is present and playing live radio feeds.

This will be backed by technology such as: proper module processor(s), Intel chips, through air antennas that collect radio fragments in air, a variety of circuits such as arithmetic, authentication, setting, cryptographic, and read-write. The compatible memory drives/modules to store data such as; pluralities of sorts (target memory, read-write units), first/ second interfaces, read-write interfaces, hard drives, and selector(s) for receiving electric signal outputted from antenna which receives radio signals, or technical items to that which are similar. External hard drives could possibly be implemented within the radios that incorporate the LRT to allow the system to have more data storage/saving capabilities; if one should need it. The other obvious technical components comprise of a variety of parts within the systems database for certain types of radios such as; arithmetic units to connect to interface, control units with similar procedures, and transmit/receive units. Each unit works together or hand in hand i.e. to transmit and receive data, read and write it, to send it to the next unit process to ultimately produce storage space and most importantly transmitting, receiving, and projecting through radio amplifying speakers resulting in crisp clear sounds we can enjoy.

The record button provides you the ability to record a segment of radio regardless if on a vehicle's stereo, boombox, alarm clock radio, or mobile/portable device if you know you will not be able to hear what is being projected at that moment or if you're interrupted. The record button will also have the technologies mentioned above or similar to that which backs the live radio button or the LRT enhancement; with the exception of additional devices, mainly internal higher capacity hard drives with appropriate gigabyte capacity needed dependent upon whether the LRT is in a vehicle stereo, boombox, alarm clock radio, or on a mobile/portable unit.

Ability to record more than thirty minutes of a radio broadcast is a feature of the LRT; as well as the groupings of recordings in their own folder that will be saved to your radio device type of choice for up to thirty days before erasing old recordings to make room for the newly saved. On the digital screen whether touch screen or not you will be able to pull up your saved recordings folder on your radio device or mobile/ portable device to play a recorded song/segment. LRT will provide the option for you the controller to make the decision to or not to have recordings in folders deleted automatically as well. That will be the huge difference in my LRT than any other item even remotely similar. LRT will also feature a similar component to that of a multi-tuner if you will, to allow radio listeners to pause one radio channel and be recording another within the same time interval on vehicle stereos, boomboxes, and alarm clock radios.

In images of the LRT system created/drawn out for different radio types as shown on (FIGS. 1A, 1B, 1C, 2A, 2B, 3A, 3B, and 4 of the drawings), the visible life sized drawings show how the dashboard touch screen radio in vehicles is revolutionized in its radio capabilities, how the culture of digital boomboxes is enhanced, and even how alarm dock radios are modernized by my "Live Radio Transformer" radio enhancement feature capabilities for all radio types. With the futuristic capabilities using relevant and evolving technical support, there are no limits to radio no matter standard analog or high definition. This radio idea is a modification for the ages and will put live radio feeds of all sorts back out in front I believe as the LRT capabilities make radio competitive again. This is not just an innovative invention for the radio world, but one that may even help boost the economy, challenge other radio enhancing ideas/proposals and give us an edge in technology advancements for the future.

BACKGROUND OF INVENTION

The radio itself in portable/plug-in form has been around since 1969 and radios in various vehicles first came into play in the 1930's. Technology has greatly advanced since the early 1900's and has given us many new ways to enjoy listening to live radio.

A few things that we haven't really had the luxury or abilities to do with radio, are the options to record/save/store, pause, rewind, or even fast forward live feeds on AM/FM/XM - HD channels in a vehicle, on a boom box alarm clock radio, or even MP3 and mobile devices. My innovative idea will change this. This is a great luxury to have in many scenarios. To name a few, catching something said on the radio that you might have missed. Recording a segment of radio on a favorite station that you know you will not be able to hear entirely. Having to answer an important phone call from (children, client, spouse, or boss) through your Bluetooth device on your digital color touch screen radio, but you really wanted to finish listening to a particular broadcast. My vision is to create/provide capabilities for a vehicle stereo, boom box radio, alarm clock radio, MP3devices and even cellular mobile devices, with the abilities to eliminate those very scenarios by being able to; record, pause, fast forward, rewind, and with the touch of a "Live Radio" button catch back up to the live feeds that are currently playing on the radio wherever you are.

There are different cases/obligations that can come about while listening to the radio whether it be in the car, at the office, or even at home in which you are enjoying what is on the radio; be it a song, a talk show, news, weather, or a game broadcast and you miss it. Now an individual would have the options to pause the live radio feed or even set it to record so that they can attend to the obligations and then play after pausing or pull up recordings later after recording the segments, hear them at a more appropriate time. I believe that this innovative idea of mine is a total game changer and will really be convenient and much appreciated by consumers nationwide.

BRIEF SUMMARY OF THE INVENTION

My invention will revolutionize the way we listen to live radio, giving stereos of all kinds and other instruments that can play live radio feeds with timeless capabilities. Giving car stereos, boom boxes, alarm clock radios, and even MP3 devices and cellular phones the options to literally transform how we receive live radio feeds. There will be options to records, pause, rewind, fast forward and even "live radio" button you can way back to the live feed.

Another great feature of the invention is the idea of the remote control that comes with the above listed radio devices except for MP3 playing items, providing the luxury/capabilities of controlling live feeds while being away from the boom box, driving but not able to reach the radio screen, or if the alarm sounds and you can't reach over to press dismiss or snooze, remote comes in handy. The remote will have all of these same capabilities/button to control and transform live radio and recordings. If a live radio segment has been previously recorded you will be able to pull up all previously recorded segments on the screen and navigate through them with remote, on the car stereo, boom box, and even alarm clock radio based on the station(s) time, and date in which they were recorded, to play them at will.

DESCRIPTION OF THE VIEWS OF THE DRAWINGS

I, Alexander Lewis, have invented an enhancement to radio for all car stereos manufactured/after market, boom boxes, alarm clock radios, MP3 devices, and cellular devices as set forth in the following description of the views of the drawings and specifications. The claimed modifications are used to control live radio feeds by allowing one to: record, pause, fast forward, rewind, and return to live radio with the push of a button on any of these radio types and devices.

Figure 1A:
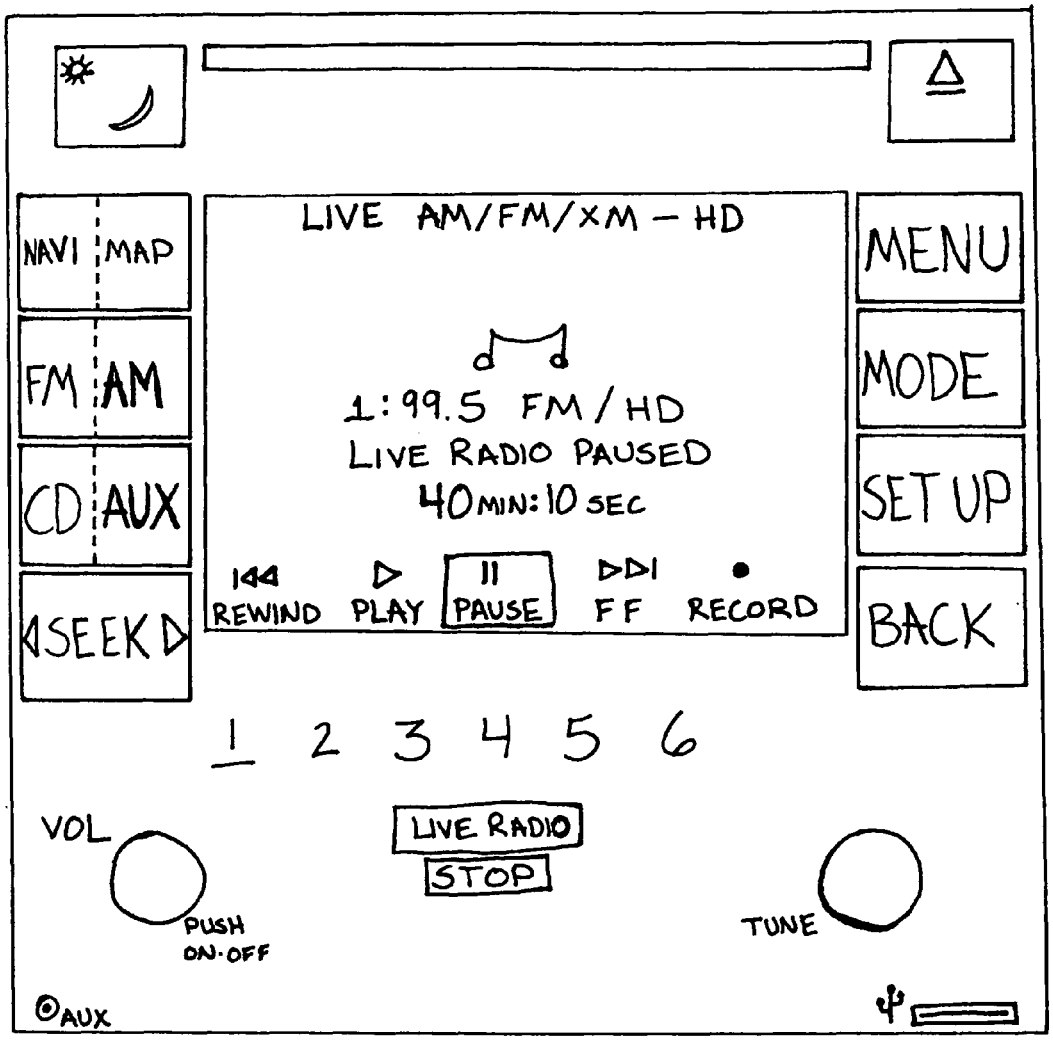
FIG. 1A is a front view of a car stereo digital touch screen displaying the options to record, pause, fast forward, and rewind live AM/FM/XM-HD radio with the PAUSE button option selected; screen in FIG. 1A also displays how to return to live radio with the push of a "Live Radio" button.
Figure 1B:
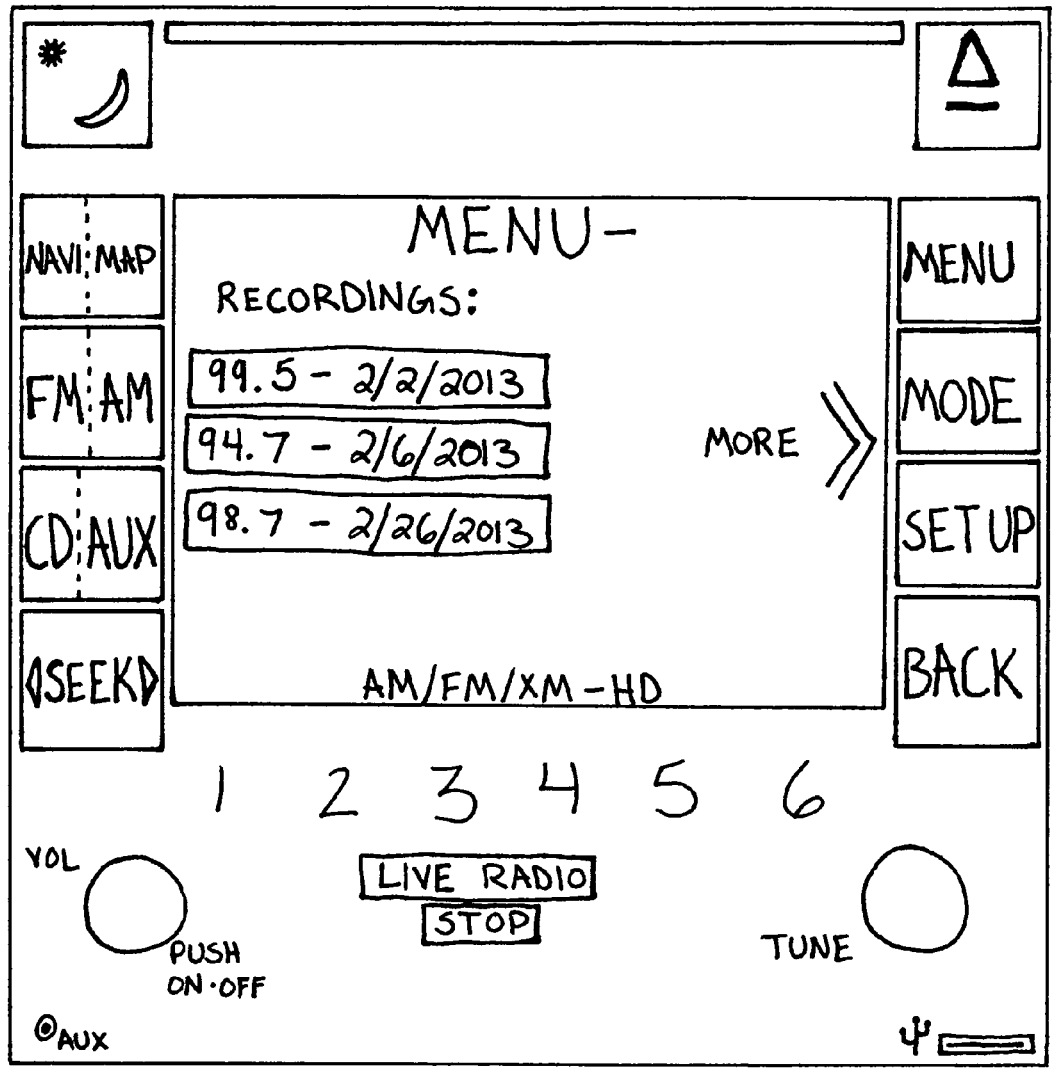
FIG. 1B is a front view of a car stereo digital touch screen displaying the options to select (on a touch screen); previously recorded/saved live radio feeds with informing details of the date, time, and specific radio station that was recorded.
Figure 1C:
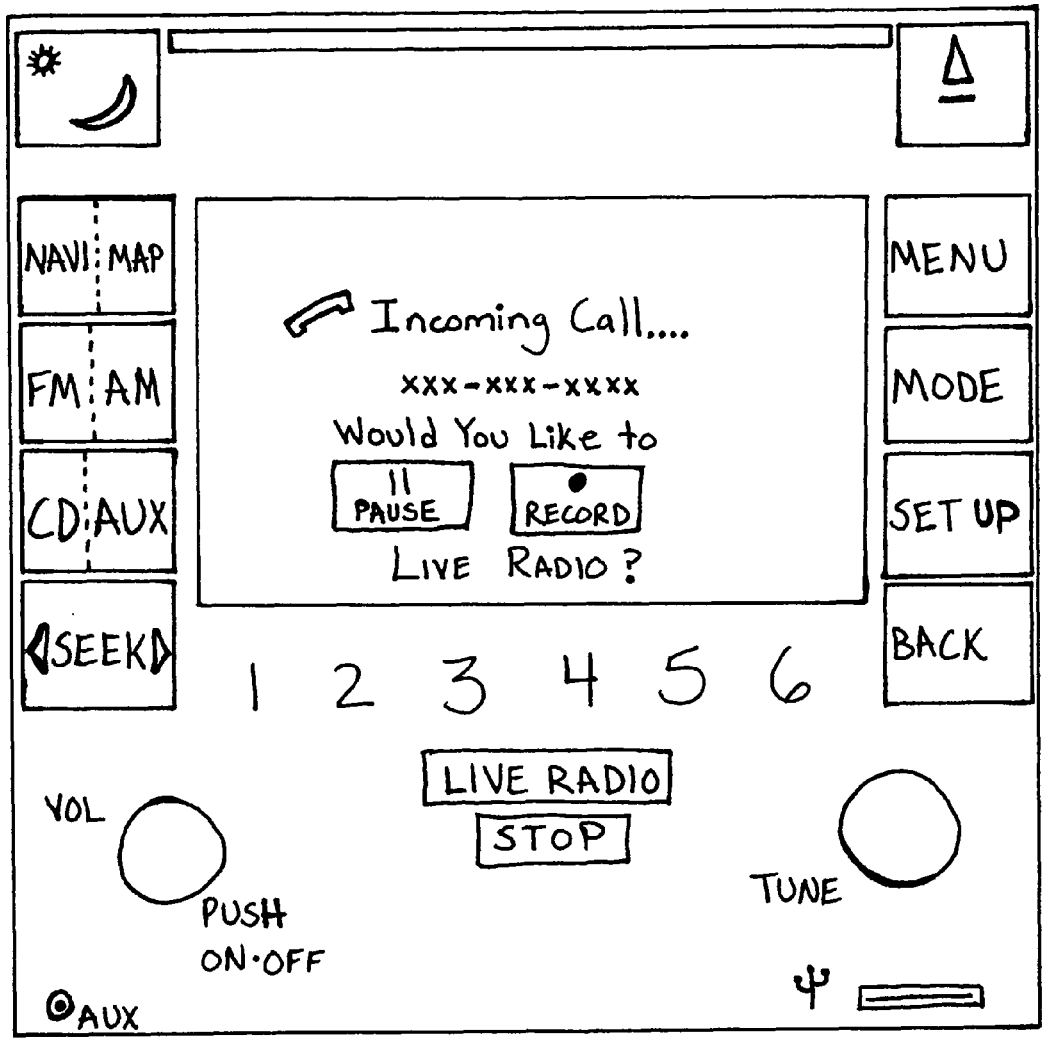
FIG. 1C is a front view of a car stereo digital touch screen displaying an incoming call being received through the Bluetooth device in a vehicle with the options to pause or record the live radio feed (on a touch screen); in which the call is interrupting; before the call is answered or declined.
Figure 2A:
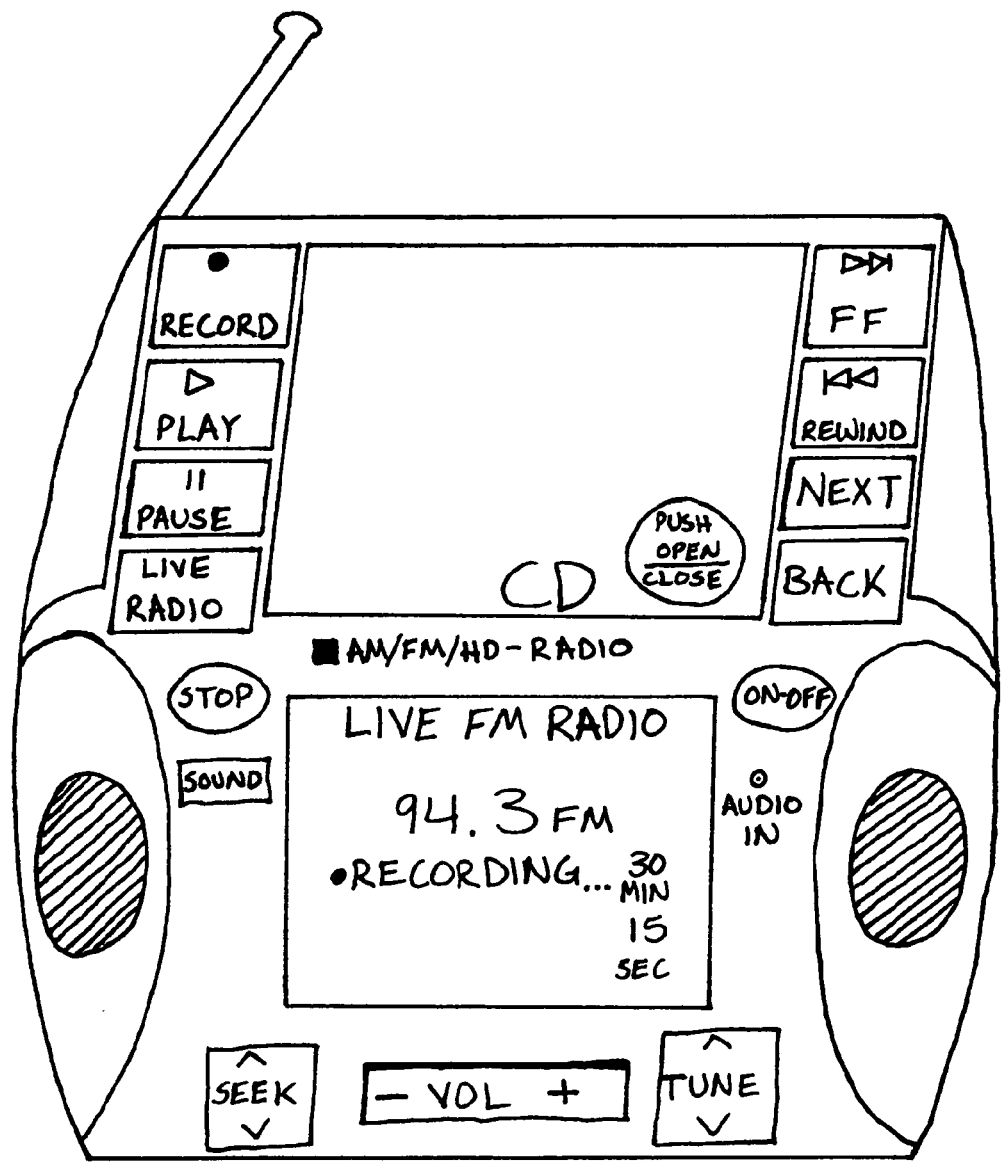
FIG. 2A is a front/top view of a boom box with a digital touch screen displaying the option to RECORD which is the selected active command seen in FIG. 2A screen view; screen displays abilities to pause, fast forward, and rewind live AM/FM/HD radio with the option to return to live radio with the push of a "Live Radio" button as well.
Figure 2B:
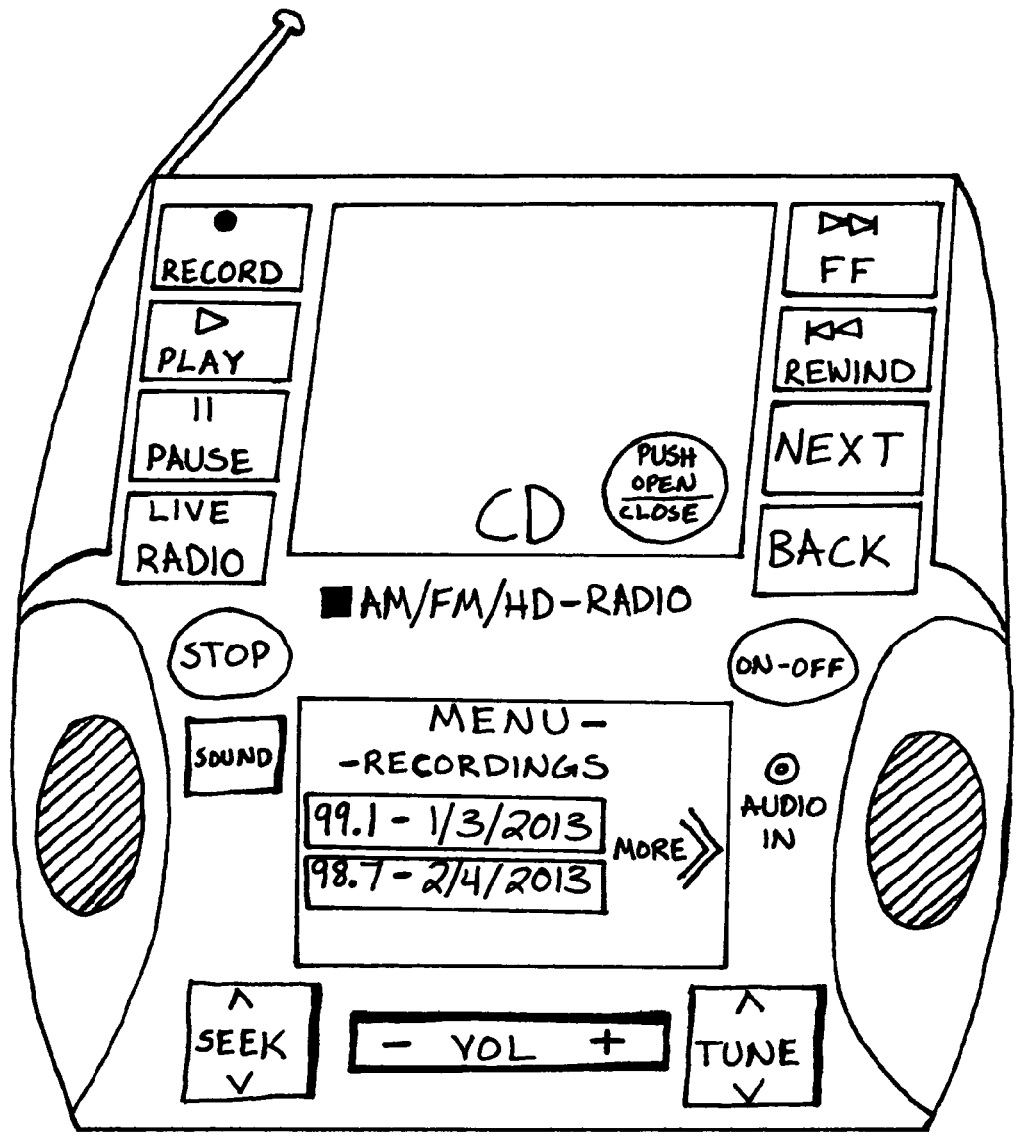
FIG. 2B is a front/top view of a boom box with a digital touch screen with the options to select (on a touch screen); previously recorded live radio feeds displaying details such as the date, time, and specific radio station that was recorded.
Figure 3A:
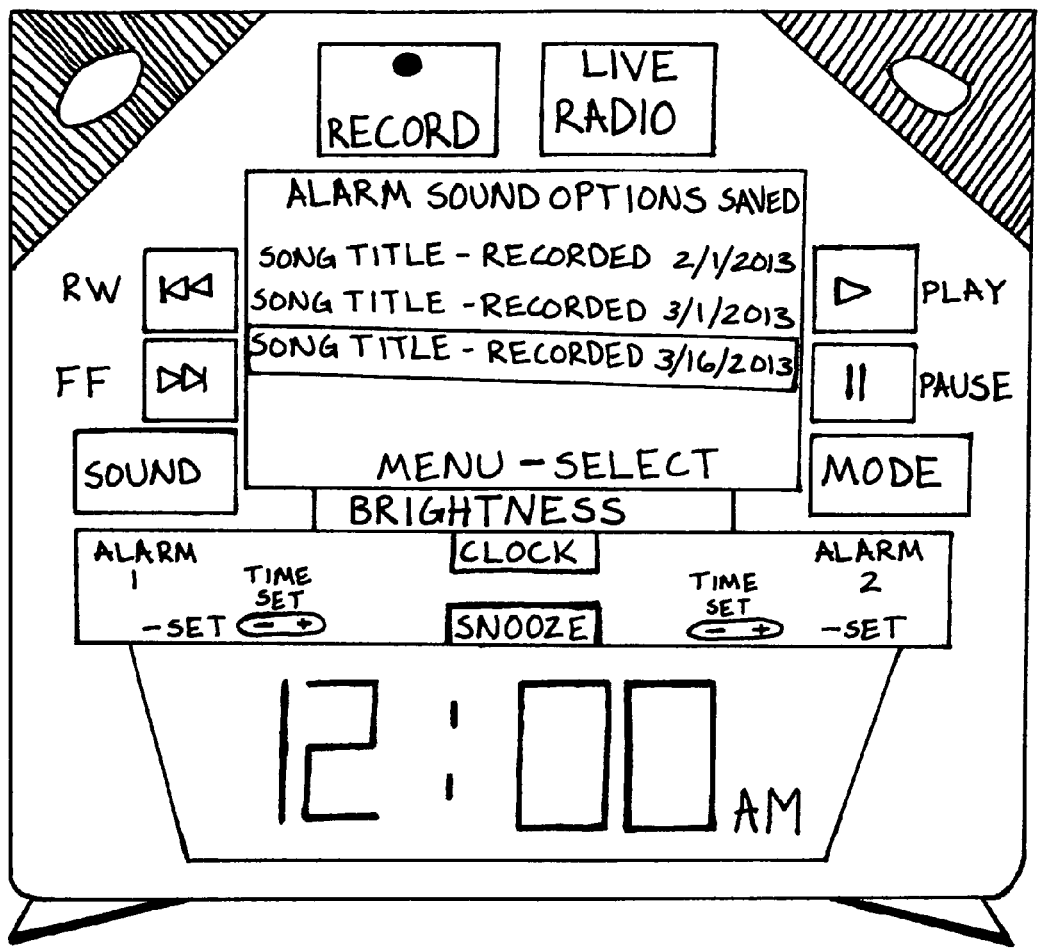
FIG. 3A is a front view of an alarm dock radio (digital touch screen) with built in leg supports for upright standing, displaying a menu/memory folder option of recordings to choose what previously recorded song you would like to select as your sounding alarm.
Figure 3B:
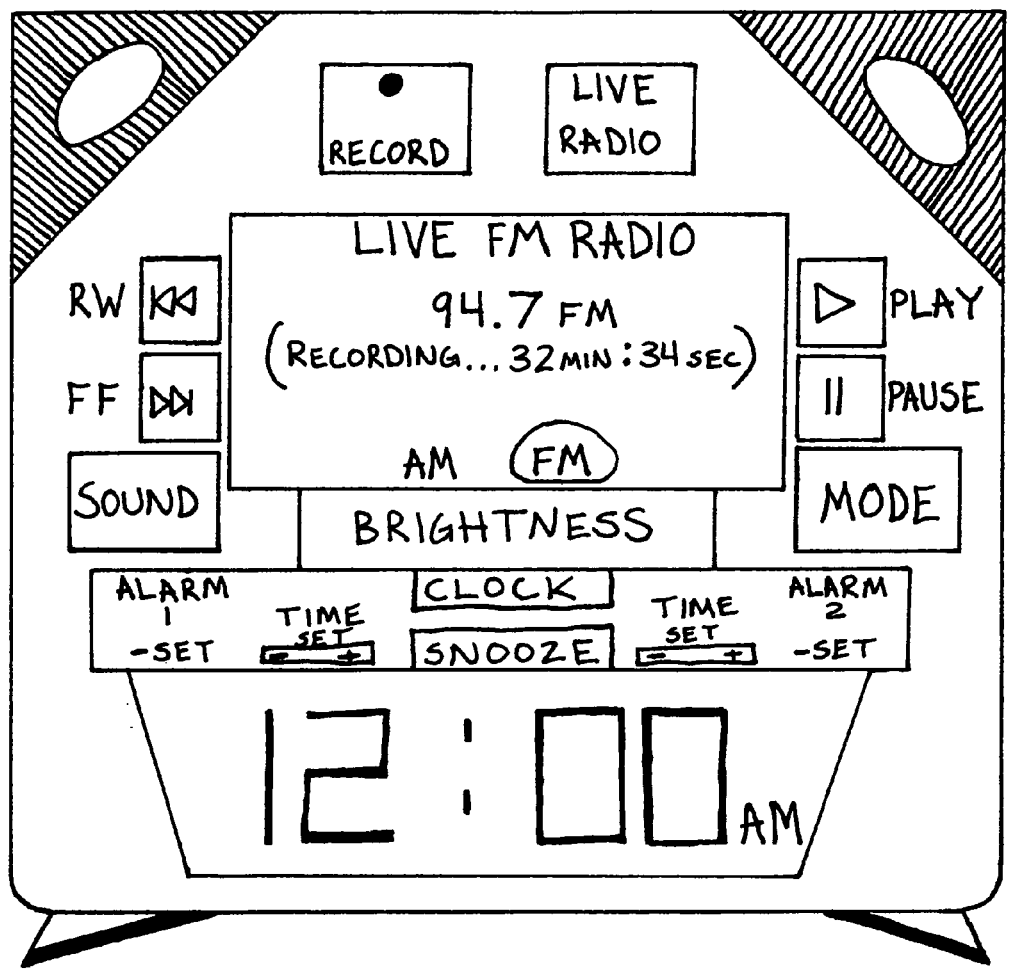
FIG. 3B is a front view of an alarm clock radio (digital touch screen) with built in leg supports for upright standing, equipped with claimed various buttons with the capabilities to record, pause, fast forward and rewind live radio feeds with the ability to push a "Live Radio" button to return to live radio.
Figure 4:
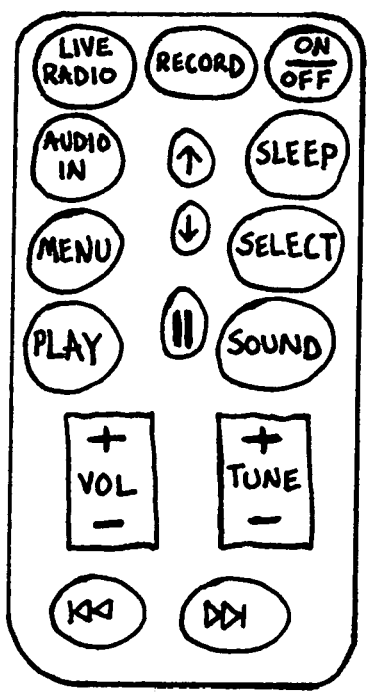
FIG. 4 is a front view of a specialty remote control equipped with the RECORD/LIVE RADIO buttons specified in claim 5 on claims page, able to record, pause, rewind, and fast forward live radio feeds transforming/controlling received radio waves through boomboxes, clock radios, and car stereos which are synced to remote device; the "Live Radio" button on remote will return you to live radio instantly with the push of the button.

I claim:

1. A system for controlling live radio feeds with a manufactured vehicle stereo, boombox, alarm clock radio, or portable audio device having memory capacity and components including capabilities comprising to record, play, pause, rewind, fast forward and save live radio feeds, wherein if a channel is interrupted a user can rewind the channel up to thirty minutes, wherein the user can also fast forward the channel or select a live radio button configured to return the user to a current radio feed, wherein the user is provided with an option to pause or record the live radio feed in process if an incoming call is received through Bluetooth® through the vehicle stereo's speakers.

2. The system of claim 1, further comprising programming the manufactured vehicle stereo, boombox, alarm clock radio, or portable audio device to automatically record the live radio feeds on a particular station with or without pre-selected time intervals.

3. The system of claim 1, further comprising options on a menu screen to retrieve the previously recorded live radio feeds located on the vehicle stereo, boombox, alarm clock radio, or portable audio device.

4. The system of claim 1, wherein the recorded live radio feeds are saved in a memory database of the vehicle stereo, boombox, alarm clock radio, or portable audio device for a default of thirty days wherein the user has the option to extend or delete what was previously recorded.

5. The system of claim 1, further comprising a remote control for the vehicle stereo, boombox, alarm clock radio, or portable audio device, wherein the remote control has the same capabilities as the screen of the vehicle stereo, boombox, alarm clock radio, or portable audio device.

6. The system of claim 1, further comprising a remote control and a mobile application, each having a live radio button configured to return the vehicle stereo, boombox, alarm clock radio, or portable audio device to the current radio feed.

7. The system of claim 1, wherein when the user makes an outgoing call through Bluetooth® through the vehicle stereo's speakers, the user is provided with an option to pause or record the live radio feed in process for up to thirty minutes.

8. The system of claim 1, wherein the live radio feeds are AM, FM, or XM-HD radio feeds.

9. The system of claim 1, wherein the live radio feeds are received through a mobile device application or on AM, FM, or XM-HD radio feeds.

10. The system of claim 1, wherein the vehicle stereo wirelessly synchronizes with a home computer, the boombox, the alarm clock radio, or the portable audio device, wherein when the user issues a command to pause or record the live radio feed while in the vehicle and subsequently presses play on the home computer, boombox, alarm clock radio, or portable audio device, the home computer, boombox, alarm clock radio, or portable audio device will tune into a radio station that was playing in the vehicle, and will resume where the user left off.

11. The system of claim 1, further comprising the capability of sounding an alarm on the alarm clock radio to play a song that was previously recorded using an alarm clock radio touch screen or a remote control device.

12. The system of claim 1, further comprising the capabilities for the vehicle stereo, boombox, alarm clock radio and remote control devices to control and/or transform the live radio feeds from the vehicle stereos, boomboxes, and alarm clock radios, including record and live radio buttons.

* * * * *